(12) United States Patent
Raghunathan et al.

(10) Patent No.: US 8,762,482 B2
(45) Date of Patent: Jun. 24, 2014

(54) DEAD SPOT MITIGATION METHODS FOR MEDIA APPLICATIONS IN VEHICULAR ENVIRONMENTS

(75) Inventors: Badri Raghunathan, San Jose, CA (US); Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 819 days.

(21) Appl. No.: 12/683,463

(22) Filed: Jan. 7, 2010

(65) Prior Publication Data

US 2011/0167128 A1 Jul. 7, 2011

(51) Int. Cl.
*G06F 15/16* (2006.01)
(52) U.S. Cl.
USPC .......................................... 709/217; 709/224
(58) Field of Classification Search
USPC ........................... 709/217–219, 223–224, 203
See application file for complete search history.

(56) References Cited

U.S. PATENT DOCUMENTS

| | | | |
|---|---|---|---|
| 6,597,906 B1 * | 7/2003 | Van Leeuwen et al. ... | 455/422.1 |
| 6,721,572 B1 * | 4/2004 | Smith et al. ................ | 455/456.1 |
| 7,076,245 B1 | 7/2006 | Satapathy | |
| 7,676,224 B1 * | 3/2010 | Bellovin ........................ | 455/423 |
| 2001/0016488 A1 | 8/2001 | Haymes et al. | |
| 2006/0040609 A1 | 2/2006 | Petschke et al. | |
| 2006/0205402 A1 | 9/2006 | Banavar et al. | |
| 2007/0004394 A1 * | 1/2007 | Chu et al. ................... | 455/422.1 |
| 2007/0190928 A1 | 8/2007 | Nichols et al. | |
| 2008/0140719 A1 | 6/2008 | Chaney et al. | |
| 2008/0201370 A1 | 8/2008 | Kemp et al. | |
| 2009/0312005 A1 * | 12/2009 | Mukundan et al. ........ | 455/422.1 |
| 2010/0255858 A1 * | 10/2010 | Juhasz ....................... | 455/456.4 |

FOREIGN PATENT DOCUMENTS

GB 2 387 074 A 10/2003

* cited by examiner

*Primary Examiner* — Philip B Tran
(74) *Attorney, Agent, or Firm* — Maginot, Moore & Beck

(57) ABSTRACT

A wireless communication method has computer-implemented steps including identifying a location of a dead spot region within an expected route of a vehicle. The vehicle has a loss of wireless connectivity within the dead spot region. Lengths of time before the vehicle will arrive at the dead spot region and before the vehicle will exit the dead spot region are estimated. Audio content and/or video content are accessed from at least one source inside the vehicle and/or at least one source outside the vehicle such that playing of the content is uninterrupted while the vehicle is within the dead spot region, the accessing being dependent upon the estimated lengths of time.

12 Claims, 6 Drawing Sheets

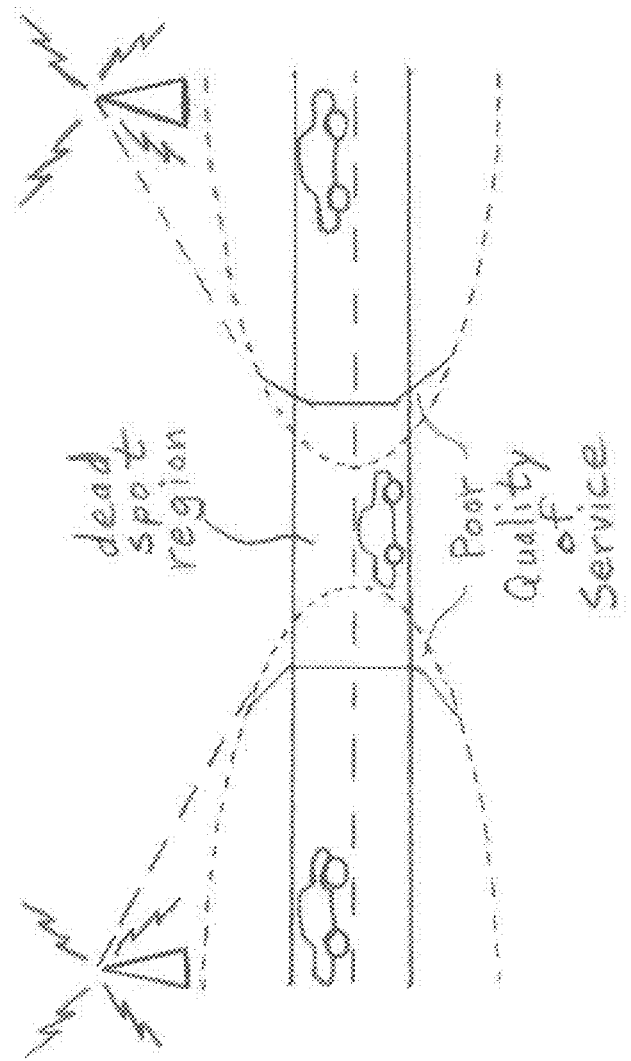

DEAD SPOT MITIGATION METHODS FOR MEDIA APPLICATIONS IN VEHICULAR ENVIRONMENTS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2009, Robert Bosch GmbH, All Rights Reserved.

BACKGROUND

1. Field of the Invention

The present invention relates to a method for wireless communication, and, more particularly, to a method for wireless communication with increased performance and reliability within a vehicle.

2. Description of the Related Art

It is known for wireless communication to be employed between and within various systems of a vehicle, such as an automobile. Attaining reliable wireless communication with a vehicle is problematic, however, because wireless communication is deeply affected by the quality of the wireless signals as received by the vehicle. The quality of the signals received by the vehicle are highly dependent upon the distance between the vehicle and the nearest transmitting base station. The relationship between signal quality and distance is primarily due to the power of the received signal dropping exponentially with increasing distance between the vehicle and the nearest transmitting base station.

Signal quality is low within so-called "dead spots" within a geographic area. Dead spots are the regions of poor/no wireless connectivity where the running application does not meet the desired quality of service. Loss of connectivity may cause disruption of connected in-car applications and may present a potential driver distraction hazard. Often this phenomenon is caused by the loss of connectivity to the base station, or to the transmitting station, due to poor coverage, i.e., low signal strength. As the numbers of users and applications grow, the limited network capacity can also lead to the bandwidth per user being reduced to a level that is insufficient for the desired quality of service.

As the capacity of cellular technologies increase and wireless proliferation in the car continues, future cars will have a lot of triple play applications (i.e., voice, data and video) running in the car. However, there must be enough wireless connectivity and capacity for such applications. As the applications grow in number and their numbers of users increase, the capacity issues will continue to arise even with the next generation of cellular technologies. Moreover, it is not economical to cover every point of road with wireless coverage and hence connectivity will also be an issue at some points along the road. A dead spot region in a section of roadway due to poor coverage is shown in FIG. 1a. A dead spot region in a section of roadway due to low network capacity and/or poor quality of service, in contrast, is shown in FIG. 1b. As mentioned above, these locations with poor connectivity or capacity may be referred to as dead spot regions. An internet-connected in-car software application is negatively impacted if the vehicle is in the dead spot region and hence leads to a poor user experience.

What is neither disclosed nor suggested in the art is a method for mobile wireless communication that overcomes the above-mentioned problems and disadvantages. More specifically, although using cellular/wireless technologies to provide internet applications in vehicle applications is very well known, the prior art does not disclose or suggest dead spot representation, maintenance, prediction or mitigation.

SUMMARY OF THE INVENTION

The present invention provides a method for mitigating the impact of dead spots on in-car multimedia applications such as internet radio and streaming media. The present invention outlines various methods for in-car internet connected applications which maintain a good user experience and reduce driver distraction. The invention may provide effective strategies to mitigate the effect of dead spots on in-car internet-connected applications. The strategies may be enabled by knowledge of the accurate timing and coverage of dead spots, and such knowledge may be obtained by use of dead spot prediction algorithms.

The invention introduces effective strategies to identify, maintain and mitigate dead spots in wireless coverage and connectivity for vehicular internet applications, and especially those including multimedia. No particular knowledge of the invention may be required of wireless service providers, and the invention may not require the vehicle to have any particular knowledge of the service providers. The invention may apply to any wireless technology, including portable personal wireless devices, cellular, WiMAX, Wi-Fi, etc., that the car uses, or that is used in the car, to communicate with the application server/provider.

The invention comprises, in one form thereof, a wireless communication method having computer-implemented steps including identifying a location of a dead spot region within an expected route of a vehicle. The vehicle has a loss of wireless connectivity within the dead spot region. Lengths of time before the vehicle will arrive at the dead spot region and before the vehicle will exit the dead spot region are estimated. Audio content and/or video content are accessed from at least one source inside the vehicle and/or at least one source outside the vehicle such that playing of the content is uninterrupted while the vehicle is within the dead spot region, the accessing being dependent upon the estimated lengths of time.

The invention comprises, in another form thereof, a wireless communication method including identifying a location of a dead spot region within an expected route of a first vehicle. The first vehicle has a loss of wireless connectivity with a provider of audio/video content while the first vehicle is within the dead spot region. Broadcasting a request signal from the first vehicle to at least one other vehicle that is in a vicinity of the first vehicle. The request signal includes an identification of a time period during which the first vehicle is expected to be in the dead spot region, and an identification of the provider of audio/video content. Received within the first vehicle is a re-broadcast signal from at least one other vehicle. The re-broadcast signal is received while the first vehicle is in the dead spot region. The re-broadcast signal includes a portion of the audio/video content that is broadcast by the provider while the first vehicle is in the dead spot region.

The invention comprises, in yet another form thereof, a wireless communication method including estimating a length of time that a vehicle will travel through a dead spot region. The vehicle has a loss of wireless connectivity with a provider of audio/video content while the vehicle is within the dead spot region. A signal is transmitted from the vehicle to the provider requesting an item of audio/video content having a time duration substantially matching the estimated length of time that the vehicle will travel through the dead spot region. Received within the vehicle is a wirelessly transmitted item of audio/video content having a time duration substantially matching the estimated length of time that the vehicle will travel through the dead spot region. The transmitted item is received before the vehicle enters the dead spot region. The transmitted item is played back within the vehicle while the vehicle is traveling through the dead spot region.

An advantage of the present invention is that the performance of mobile wireless communications apparatus while traveling through dead spots may be improved.

Another advantage is that the present invention may be implemented regardless of the underlying wireless service provider.

Yet another advantage is that the invention may be employed in any automotive internet application, and especially in those applications including multimedia.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1b is a diagram of a wireless communication dead spot region along a section of roadway due to low network capacity and/or poor quality of service according to the prior art.

Figure 1A:
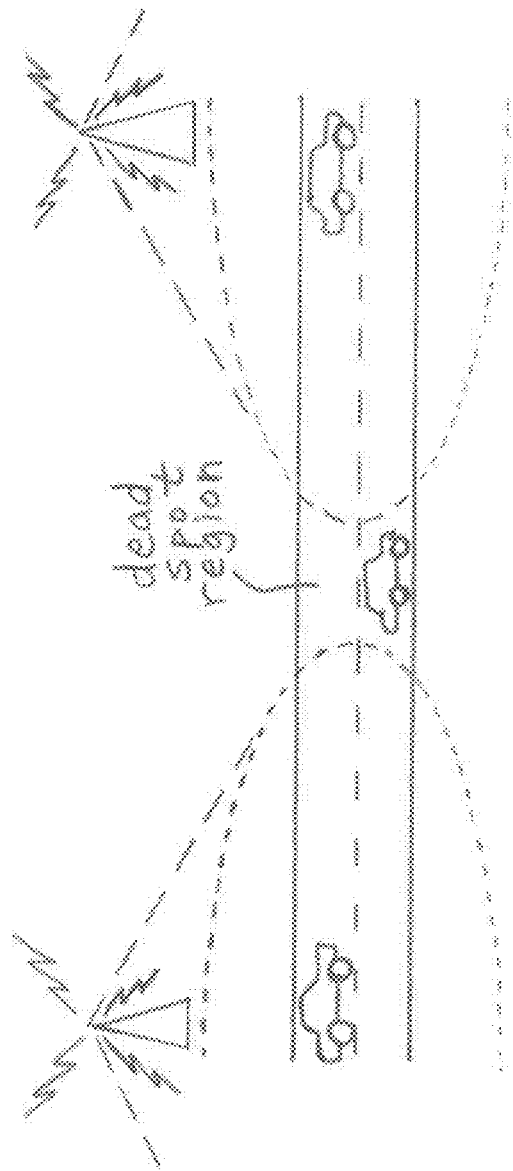
FIG. 1a is a diagram of a wireless communication dead spot region along a section of roadway due to poor coverage according to the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

An application will not perform well if the vehicle is in the dead spot region, and the poor performance inevitably leads to an unpleasant user experience. In order to enhance application performance, techniques to handle dead spots and mitigate their effects may be implemented as a three step process. A first step is dead spot identification and maintenance; a second step is dead spot prediction; and a third step is dead spot mitigation. Methods directed to the first and second step are disclosed in U.S. patent application Ser. No. 12/406,219, entitled "Dead Spot Prediction Method for Wireless Vehicular Applications", filed Mar. 18, 2009, which is hereby incorporated by reference herein in its entirety, and which is assigned to the assignee of the present invention. The present invention may be directed to the third step of dead spot mitigation, which may be application domain specific.

Figure 2:
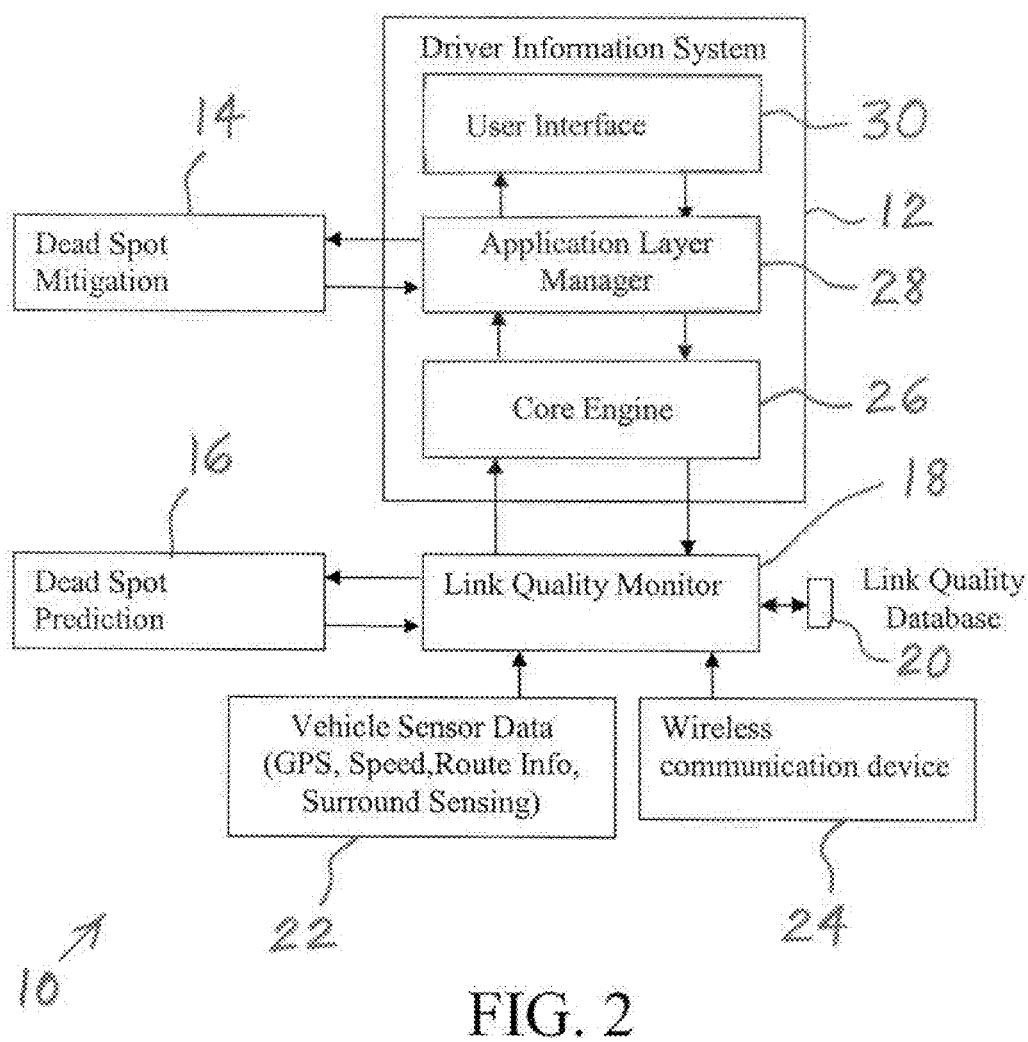
FIG. 2 is a block diagram of one embodiment of a dead spot mitigation arrangement of the present invention.

One embodiment of a dead spot mitigation arrangement 10 of the present invention is illustrated in FIG. 2, including a driver information system 12, a dead spot mitigation module 14, a dead spot prediction module 16, a link quality monitor 18, a link quality database 20, a vehicle data bus 22, and a wireless communication device 24. Link quality monitor 18 may obtain sensor information from vehicle data bus 22 (GPS data, speed, navigation routes, etc.) and may obtain the wireless link quality metrics from wireless communication device 24 (dedicated modem, mobile phone, etc.). Link quality monitor 18 may determine the state of the current wireless link connectivity, which may be used in implementing a reactive mitigation method of the invention. Link quality monitor 18 may also look ahead using dead spot prediction algorithms to predict the quality of the wireless link connectivity in the approaching vicinity, which may be used in implementing a proactive mitigation method of the invention.

Based on the above two parameters (i.e., the current and predicted quality of wireless link connectivity), link quality monitor 18 may send a signal to a core engine 26 in driver information system 12. Core engine 26, in turn, may relay the signal (based on in-car context information) to an application layer manager 28 if the car is currently in a dead spot or will be approaching a dead spot. Core engine 26 may also send to application layer manager 28 related parameters such as the expected time of arrival (or time to arrival) at a dead spot, the expected throughput rate, etc. Application layer manager 28 may then activate a dead-spot mitigation method from a set of pre-coded, application-specific steps. Possible applications include various in-car streaming multimedia applications such as internet radio, online music stores, video streaming etc.

According to the invention, possible dead spot mitigation methods may include navigation playlists for mixed playback; download optimization of real-time playback; cooperative playback; on-demand/dynamic advertising; and user feedback. In the "navigation playlists for mixed playback" method, the playlists may be constructed using information from driver information system 12 and wireless link quality monitor 18. Based on the current navigation route information, the playlist may be optimized for driving time and wireless network connectivity along the route. For example, the playlist content may be selected in a manner such that the playlist will end playback upon reaching the destination. That is, the total time duration of the selections on the playlist may approximately match the remaining expected length of time of the planned trip. Such schemes may include playing songs, videos and/or other items from either the internet or the on-board selection of items stored within the vehicle or within mobile personal electronic players.

The navigation playlists for mixed playback method may include continuous streaming. The playlist may stream multimedia content from the internet when the connection is good. On the other hand, when a dead spot is predicted, the content that is planned to be played while the vehicle is in the dead spot may be selected from an on-board collection of playback items. Thus, the playlist content may be selected from a variety of sources, such as the Internet and on-board sources, in a manner that accounts for drops in wireless network connectivity along the planned route.

As another feature or advantage of the navigation playlists for mixed playback method, when a dead spot is predicted, playback items obtained from the internet may be selected with the criterion that the end of the playback item will be reached before loss of connectivity is expected to occur. Alternatively, if an item is not expected to be completed before a dead spot is arrived at, then the item may be downloaded (if possible and permitted) from the radio station or internet before the dead spot is arrived at. Thus, the users inside the vehicle do not miss the end of the item that they are listening to and/or viewing.

As yet another feature or advantage of the navigation playlists for mixed playback method, the playlist can be created on-demand from various resources based on the driver's/passengers' interests including various parameters such as genre of music/video; mood of the driver/passengers; year of creation of the item; singers or other artists; length or time duration of the item, etc.

In the "download optimization for real-time playback" method, the content that is played back may be from the internet. The system may use wireless coverage look-ahead from link quality monitor 18 and may initiate download optimization (e.g., prefetching, caching, acceleration) methods to deal with an upcoming drop in wireless connectivity. With this method, the system may build up a cache by the time the vehicle enters a wireless dead spot. The system may utilizes this cache of application data for playback during the time the vehicle travels through the deadspot.

According to this download optimization for real-time playback method, the speed of the download may be accelerated so that the download is completed before the vehicle arrives at the dead spot. The download speed may be accelerated by either having multiple threads or using multiple wireless technologies for multiple simultaneous connections to the application server. Also according to this download optimization for real-time playback method, pre-fetching/caching may be performed. If allowed or enabled, the content may be downloaded/prefetched before the vehicle enters the dead spot region, and thus the vehicle may have access to the content while the vehicle is in the dead spot region. Further according to this download optimization for real-time playback method, quality-tradeoff schemes may be implemented. In scenarios where the system experiences bad connectivity, a quality tradeoff can be made to enable real-time streaming. The real-time streaming may be achieved by using connectionless protocols (e.g., wherein no session state information is maintained) such as User Datagram Protocol (UDP) instead of connection-oriented protocols (e.g., wherein session state information is maintained) such as Transmission Control Protocol (TCP). The system can thus achieve real-time streaming with higher jitter.

In the "cooperative playback" method, if the vehicle expects to be in a dead spot region, then the vehicle may wirelessly broadcast this information (e.g., the time period during which the vehicle expects to be in the dead spot region) as well as an identification of the radio/television station to which the vehicle is tuned. Any nearby vehicles within the broadcast range of the vehicle may receive the broadcasted information and station identification. So, if any other vehicle within the broadcast range of the original vehicle has network coverage and is tuned to this station, then the other vehicle may immediately re-broadcast the received multimedia content while the original vehicle is in the dead spot region. The original vehicle may then receive the re-broadcast signal from the other vehicle, and thus the users in the original vehicle may continue to enjoy the content without interruption of the received signal when the original vehicle enters the dead spot region.

A feature of the cooperative communication between vehicles in the cooperative playback method may be the usage of different wireless technologies by the two vehicles. For example, the two vehicles may communicate using different wireless technologies such as WiFi (IEEE 802.11—wireless LAN) and WiMAX (Worldwide Interoperability for Microwave Access, also known as the IEE 802.16 standard or broadband wireless access).

Another feature of the cooperative communication between vehicles in the cooperative playback method may be the usage of a predefined channel and technology. For example, the wireless technology and the channel used for initial handshaking can be predetermined.

Yet another feature of the cooperative communication between vehicles in the cooperative playback method may be that the vehicle that is going to be in dead spot region may communicate with various vehicles simultaneously using a predetermined and available multiple channel access scheme. Such schemes may include code division multiple access (CDMA), orthogonal frequency division multiple access (OFDMA), etc.

In the "on-demand/dynamic advertising" method, if a dead spot is encountered during playback of content, then a selected multimedia advertisement may be played for the duration of the vehicle being in the current dead spot. In such a case, the advertisement may be downloaded while the vehicle is enjoying the good link quality. Also, when the vehicle expects to enter the dead spot region, it can request advertisements from radio stations, wireless service providers, web-service operators and other local entities. As supposed to streaming multimedia, the advertisements may nearly always be downloaded and played. Additionally the advertisements can be customized to the driver behavior, route information and other vehicle context. In one embodiment, the method includes a revenue sharing scheme based on such personalized advertisements to the driver. Advertisement display/playback during dead spot experiences could potentially reduce negative feedback from the driver that could result from poor user experience during dead spots. For example, advertisements relating to deals along the selected route can be downloaded prior to route travel and may be displayed/played to the driver during the driving time spent in dead spots.

In another embodiment, an advertisement is selected and/or modified to match the time duration that the vehicle is expected to be in the dead spot. For example, while still having good connectivity, the vehicle may predict, based in part on its current and/or expected rate of speed, that the vehicle will soon be without good connectivity for a time duration of say thirteen seconds. The vehicle may then request an advertisement having a time duration of thirteen seconds from radio stations, wireless service providers, web-service operators and/or other local entities.

In one embodiment, the advertisement provider may modify an advertisement of a different time duration to match the time duration of the requesting vehicle's loss of connectivity. For example, the advertisement provider may select an unabridged advertisement of fifteen seconds and delete therefrom two seconds of content that the provider deems to be of least importance when presented to the user of the requesting vehicle. The decision of what two seconds of content to delete may be based upon the requester's geographic area of residence or other demographic information related to the requester. For example, a two second reference in the advertisement to a retailer disposed outside of the requester's geographic area of residence may be deleted from the advertisement as provided to the requester. Alternatively, the advertisement provider may divide the fifteen second advertisement into a plurality of time segments, each one second long for example, and rank the fifteen one-second segments in order of importance. Then, in response to a request for a thirteen second advertisement, the advertisement provider may provide the fifteen second advertisement with the two least important one-second segments being deleted therefrom to thereby arrive at a thirteen second advertisement. Such modification of the time duration of an advertisement may be performed in real time in response to a request, or may be performed before the request. For example, the advertisement provider may create and store advertisements to match each possible range of dead spot duration, and to match each possible user demographic. Thus, in response to a request for an advertisement having a particular time duration from a user having a particular demographic, the advertiser retrieves from memory an unabridged, existing advertisement having the requested time duration and corresponding to the demographic information (e.g., gender, age, area of residence, etc.) associated with the user.

In the "user feedback" method, feedback is provided to the user related to one or more predicted dead spots that the vehicle is expected to travel through along its planned route. Alternatively, or in addition, the user may be informed at the point in time at which the vehicle arrives at the dead spot and connectivity is lost. For example, if a dead spot is encountered during playback of content, then the driver may be explicitly informed via a user-interface layer 30 in a manner which imposes a low level of cognitive load on the driver. This notification may be of visual, auditory and/or haptic form. Proactive feedback to the user concerning an estimated distance or estimated time to an upcoming dead spot and/or an estimated time-of-travel or distance-of-travel of the vehicle through the dead spot or a length of the dead spot may be of high value to the driver and may increase the user's satisfaction with the system.

Figure 3:
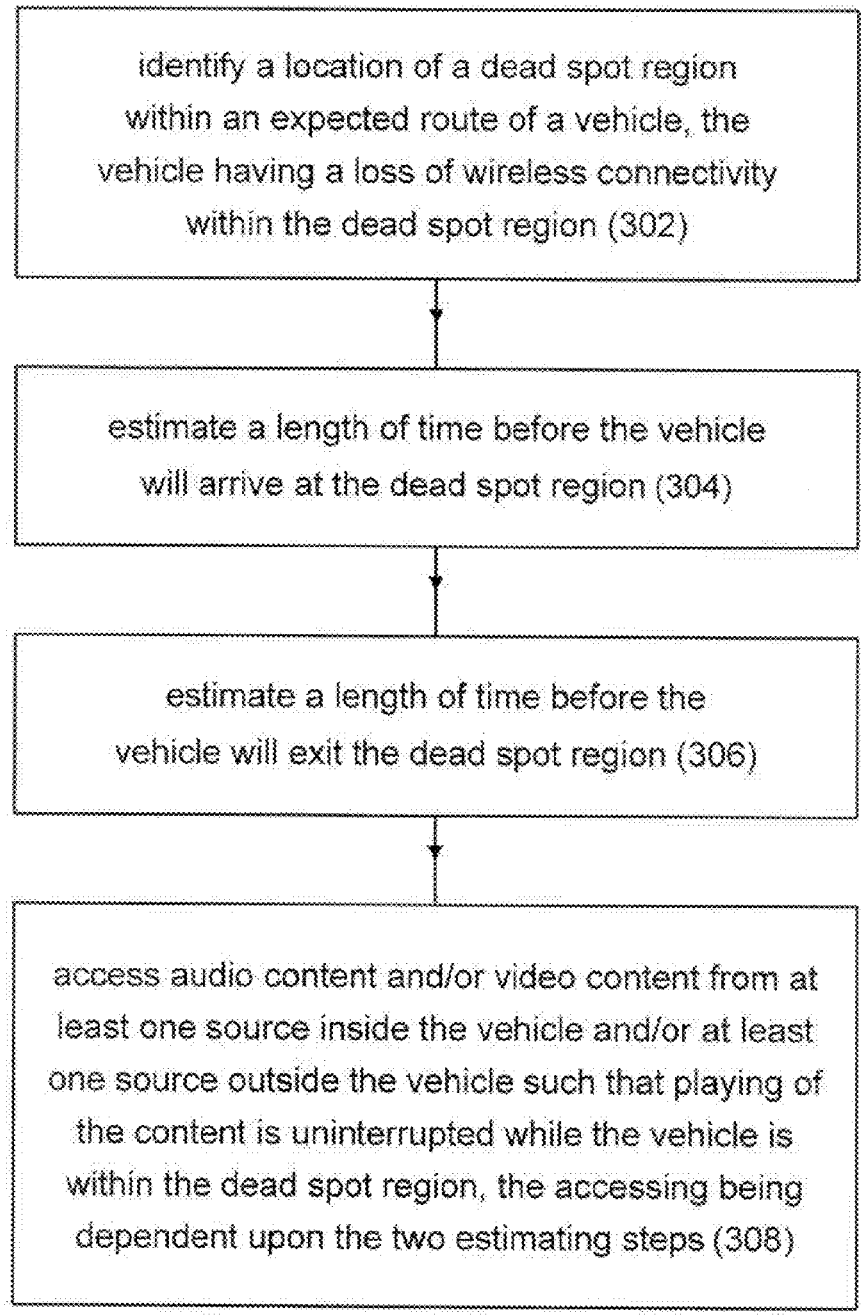
FIG. 3 is a flow chart of one embodiment of a wireless communication method of the present invention.

One embodiment of a wireless communication method 300 of the present invention is illustrated in FIG. 3, in which all of the steps may be computer-implemented. In a first step 302, a location of a dead spot region within an expected route of a vehicle is identified. The vehicle has a loss of wireless connectivity within the dead spot region. For example, a location of a dead spot region, as shown in FIGS. 1a and 1b, within an expected route of the vehicle may be identified. Although the dead spots are shown in FIGS. 1a and 1b as being about equal in length to the length of a vehicle for ease of illustration, it is to be understood that the lengths of the dead spots in actuality may be hundreds or thousands times greater than a length of a vehicle. The identification of the dead spot before the vehicle enters the dead spot may result from the vehicle having previously sensed the dead spot when passing through it. The sensing of the dead spot may have occurred when the vehicle no longer received external wireless communications while in the dead spot. Using GPS, the vehicle may have later transmitted the location coordinates of the dead spot to the service provider, and the service provider may have shared the location coordinates with all other vehicles in the vicinity of the dead spot. Alternatively, the vehicle may have passed through and sensed a dead spot previously, and may have recorded the location coordinates of the dead spot for future use.

In a second step 304, a length of time before the vehicle will arrive at the dead spot is estimated. That is, having identified the geographical coordinates of the dead spot region in the previous step, the vehicle may compare those geographical coordinates to the vehicle's current geographic coordinates as may be determined via GPS. From this comparison of the geographical coordinates, the vehicle may determine a distance between the vehicle's current location and the nearer end of the dead spot region. Based upon this distance and the recent average speed of the vehicle (or, if different, a predicted average speed of the vehicle between its current location and the beginning of the dead spot region), a length of time before the vehicle will arrive at the dead spot region can be easily estimated.

In a third step 306, a length of time before the vehicle will exit the dead spot is estimated. That is, having identified the geographical coordinates of the dead spot region in the previous step, the vehicle may compare those geographical coordinates to the vehicle's current geographic coordinates as may be determined via GPS. From this comparison of the geographical coordinates, the vehicle may determine a distance between the vehicle's current location and the farther end of the dead spot region. Based upon this distance and the recent average speed of the vehicle (or, if different, a predicted average speed of the vehicle between its current location and the end of the dead spot region), a length of time before the vehicle will exit the dead spot region can be easily estimated.

In a final step 308, audio content and/or video content is accessed from at least one source inside the vehicle and/or at least one source outside the vehicle such that playing of the content is uninterrupted while the vehicle is within the dead spot region. The accessing is dependent upon the two estimating steps 304 and 306. Many examples of accessing the audio/video content in such a manner are disclosed hereinabove, particularly, with regard to the navigation playlists for mixed playback method and the download optimization for real-time playback method. As one example, a playlist can be created including streaming multimedia content from the internet and from radio stations such that all items on the playlist can be completed before the dead spot region is entered. During any time remaining before arrival at the dead spot region, and during the time spent within the dead spot region, content from in-vehicle sources (e.g., compact discs and personal music players), may be played within the vehicle.

As another example of accessing content such that it is uninterrupted during a dead spot, content may be downloaded from a web site or a radio/television station in anticipation of a dead spot region being in the planned route of the vehicle. Thus, instead of continuing to receive the content in streaming or real-time form, the content converted into on-board content that the vehicle can access while traveling through a dead spot region.

As yet another example of accessing content such that it is uninterrupted during a dead spot, the vehicle may use a connectionless protocol like UDP while in a dead spot, rather than a connection-oriented protocol like TCP. Although the loss of session state information may result in lower quality data and high jitter, it may be thus possible to maintain real-time streaming throughout the dead spot region.

Figure 4:
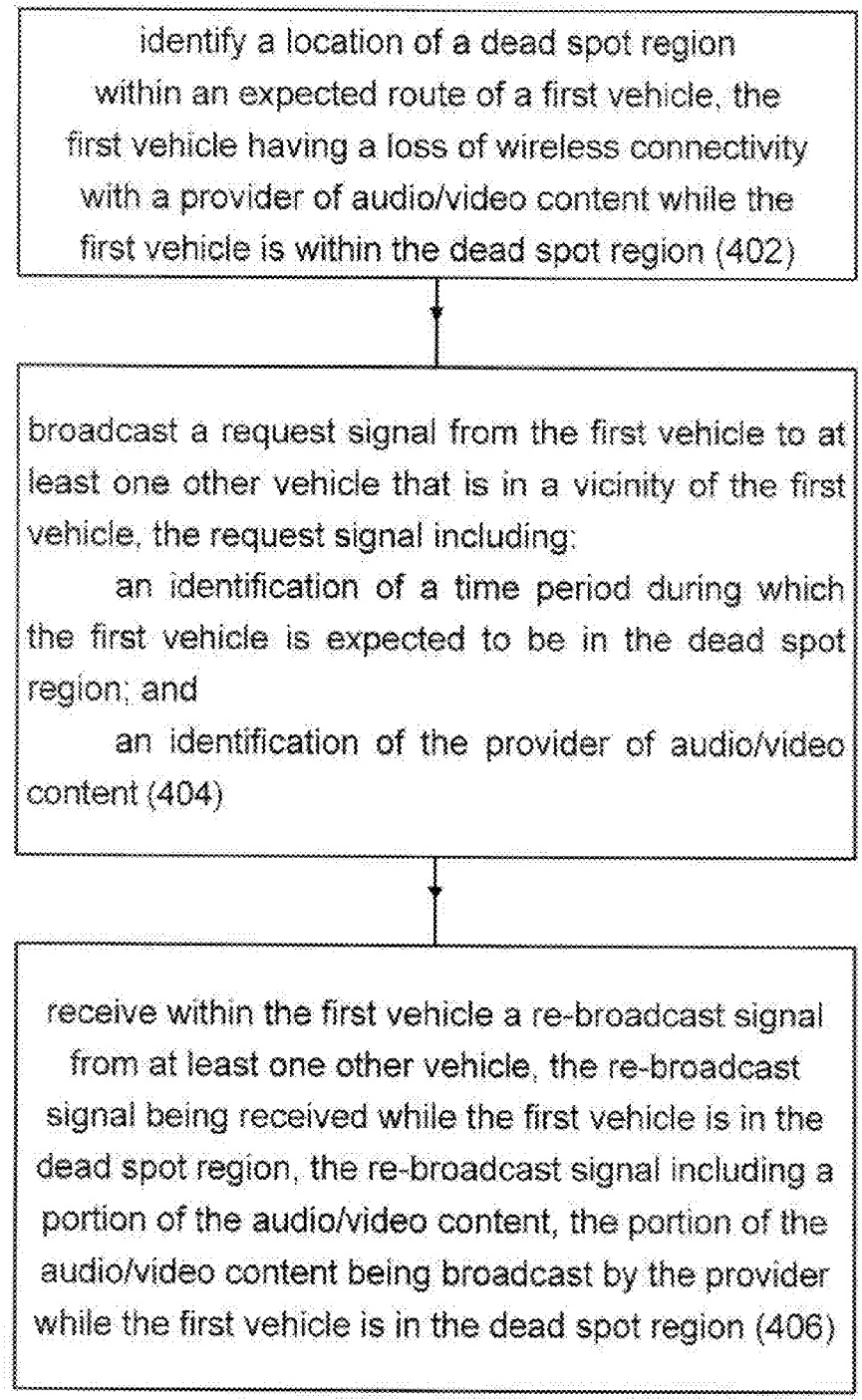
FIG. 4 is a flow chart illustrating another embodiment of a wireless communication method of the present invention.

Another embodiment of a wireless communication method 400 of the present invention in which all of the steps may be computer-implemented is illustrated in FIG. 4. In a first step 402, a location of a dead spot region within an expected route of a first vehicle is identified. The first vehicle has a loss of wireless connectivity with a provider of audio/video content while the first vehicle is within the dead spot region. For example, a location of a dead spot region, as shown in FIGS. 1a and 1b, within an expected route of the vehicle may be identified. The identification of the dead spot before the vehicle enters the dead spot may result from the vehicle having previously sensed the dead spot when passing through it. The sensing of the dead spot may have occurred when the vehicle no longer received external wireless communications from a provider of audio/video content while in the dead spot. Using GPS, the vehicle may have later transmitted the location coordinates of the dead spot to the service provider, and the service provider may have shared the location coordinates with all other vehicles in the vicinity of the dead spot. Alternatively, the vehicle may have passed through and sensed dead spot previously, and may have recorded the location coordinates of the dead spot for future use.

In a second step 404, a request signal is broadcast from the first vehicle to at least one other vehicle that is in a vicinity of the first vehicle. The request signal may include an identification of a time period during which the first vehicle is expected to be in the dead spot region, and an identification of the provider of audio/video content. For example, a first vehicle that identifies an upcoming dead spot may broadcast a local wireless signal, such as via WiFi or WiMAX technology. The local wireless signal may specify the time period that the vehicle expects to be in the dead spot, such as from 11:53:04 am to 11:53:47 am Eastern Standard Time. The local wireless signal may also specify the content provider whose content the first vehicle would like some other nearby vehicle to re-broadcast. For example, the signal may include the call letters and/or broadcast frequency of a radio or television station. As another possibility, the signal may include an internet address that is providing streaming audio and/or video content.

In a final step 406, received within the first vehicle is a re-broadcast signal from at least one other vehicle. The re-broadcast signal may be received while the first vehicle is in the dead spot region, and may include a portion of the audio/video content. The portion of the audio/video content may have been broadcast by the provider while the first vehicle is in the dead spot region. For example, several other vehicles in the vicinity of the first vehicle may have received the signal from the first vehicle specifying the time period and content provider whose content the first vehicle is unable to receive while in the dead spot. At least one of the other vehicles may be tuned to, or otherwise in communication with, the specified content provider. Alternatively, at least one of the other vehicles may have an unused first tuner or a second tuner that can be tuned to the specified content provider. Similarly, at least one other vehicle may be able to visit an internet address specified by the signal from the first vehicle. The other vehicle may capture the content from the specified provider during the time period in which the first vehicle indicates that it expects to be in the dead spot region (e.g., in the example above, from 11:53:04 am to 11:53:47 am Eastern Standard Time). After capturing the content, the other vehicle may immediately re-broadcast the captured content using the same format/protocol as, or a different format/protocol than, used by the first vehicle in broadcasting the time period and content provider. The other vehicle may continue to capture additional content during the specified time period while also continuing to re-broadcast the content already captured. Thus, with perhaps less than one second of interruption of the content, the first vehicle may stop receiving content directly from the content provider, and may begin receiving content re-broadcast from another vehicle.

In one embodiment, there may be some overlapped time periods in which the first vehicle may receive both the direct broadcast from the content provider and the re-broadcast content from at least one other vehicle. For example, the first vehicle may request re-broadcast beginning five seconds before the first vehicle expects to lose connectivity so that it is more likely that the first vehicle does not miss any content.

In one embodiment, the first vehicle may receive re-broadcasted content from multiple other vehicles simultaneously. Thus, if the first vehicle is temporarily unable to receive the rebroadcast content from one of the other vehicles, then the first vehicle may still be able to receive the rebroadcast content from another one of the other vehicles, and thereby will not miss receiving any content.

As described above, the content is immediately re-broadcast such that the re-broadcast is substantially simultaneous with, or is delayed by less than one second as compared with, the original broadcast from the content provider. However, it is also possible within the scope of the invention for the original broadcast of the content during the specified time period to be captured and stored in memory by one of the other vehicles that receives the requesting signal from the first vehicle. At the conclusion of the specified time period, the other vehicle may re-broadcast the portion of the content from the specified time period in its entirety. After emerging from the dead spot, the first vehicle may simultaneously receive the re-broadcasted content from the other vehicle as well as the real-time broadcast from the original content provider. The first vehicle may playback the re-broadcasted content as it is received and may store the real-time broadcasted content from the original provider. The first vehicle may skip playback of commercials or other undesired content in the re-broadcasted signal until the re-broadcasted signal can catch up with the real-time signal. If the re-broadcasted signal does not catch up with the real-time signal before the end of the re-broadcasted signal, then the first vehicle may continue to store the real-time content until the playback within the vehicle can catch up with the real-time content, such as by skipping commercials and other undesired content.

In one embodiment, the storage of the real-time broadcast ceases at the end of an item of content (e.g., at the end of a song). When playback of the content within the first vehicle reaches the end of the item, then the playback joins the real-time broadcast direct from the content provider.

Figure 5:
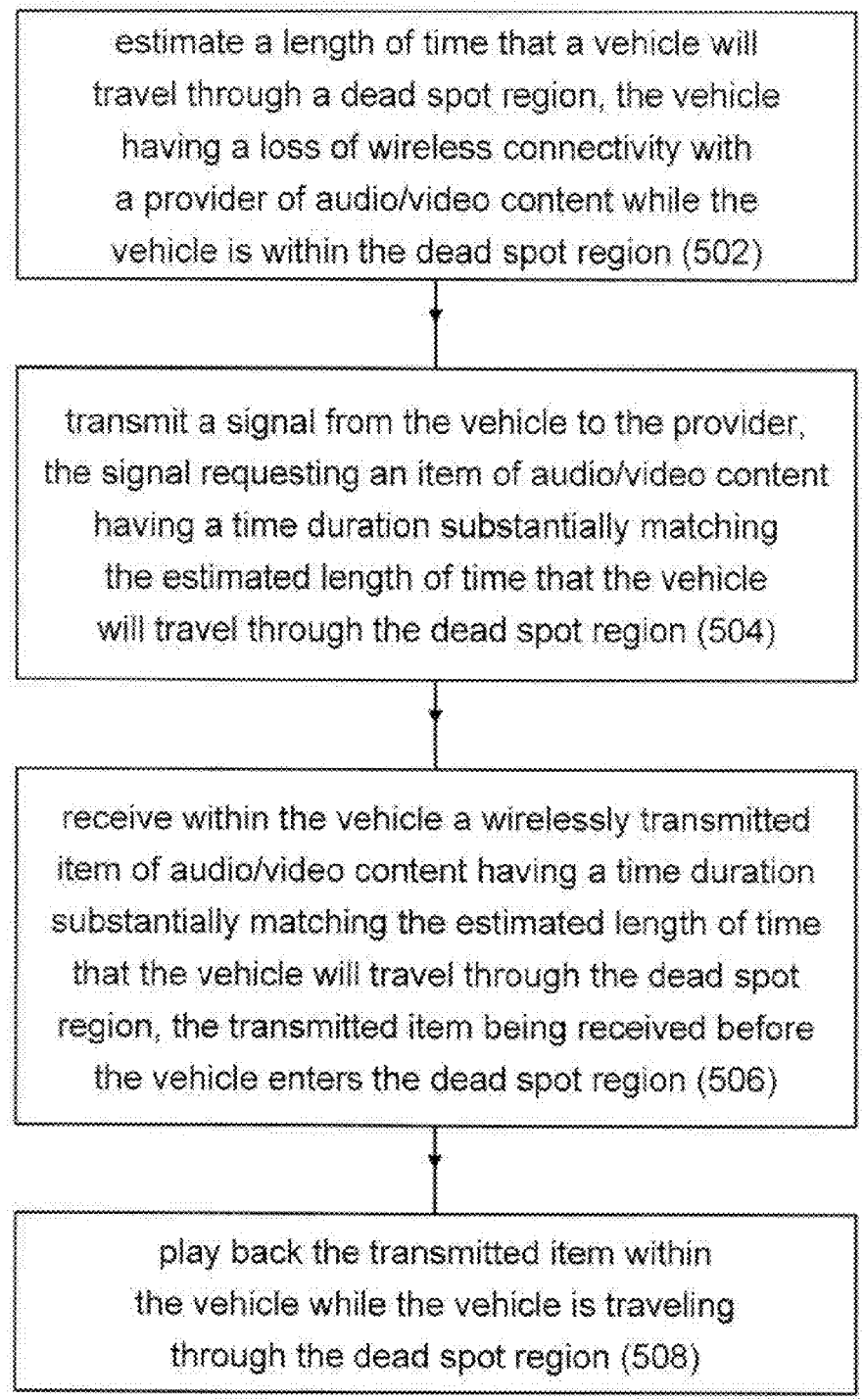
FIG. 5 is a flow chart illustrating yet another embodiment of a wireless communication method of the present invention.

Yet another embodiment of a wireless communication method 500 of the present invention is illustrated in FIG. 5. In a first step 502, a length of time that a vehicle will travel through a dead spot region is estimated. The vehicle may have a loss of wireless connectivity with a provider of audio/video content while the vehicle is within the dead spot region. For example, a location of a dead spot region, as shown in FIGS. 1*a* and 1*b*, within an expected route of the vehicle may be known to the vehicle. The location of the dead spot may be known to the vehicle as a result of the vehicle having previously sensed the dead spot when passing through it. The sensing of the dead spot may have occurred when the vehicle no longer received external wireless communications while in the dead spot. Using GPS, the vehicle may have later transmitted the location coordinates of the dead spot to the service provider, and the service provider may have shared the location coordinates with all other vehicles in the vicinity of the dead spot. Alternatively, the vehicle may have passed through and sensed dead spot previously, and may have recorded the location coordinates of the dead spot for future use. The vehicle may then use the geographical coordinates of the dead spot to ascertain a length of the dead spot in the vehicle's direction of travel. Based upon this dead spot length and the recent average speed of the vehicle (or, if different, a predicted average speed of the vehicle through the dead spot region), a length of time that the vehicle will travel through the dead spot region can be easily estimated.

In a second step 504, a signal is transmitted from the vehicle to the provider. The signal may request an item of audio/video content having a time duration substantially matching the estimated length of time that the vehicle will travel through the dead spot region. For example, the vehicle may transmit a wireless signal to an application server/provider such as a media station or web site by use of cellular, WiMAX or Wi-Fi technology. The transmitted signal may request an item of audio/video content (e.g., a song, video or advertisement) that has a time duration that is approximately equal to the estimated length of time from step 502 that the vehicle will be in the dead spot.

In a third step 506, received within the vehicle is a wirelessly transmitted item of audio/video content having a time duration substantially matching the estimated length of time that the vehicle will travel through the dead spot region. The transmitted item is received before the vehicle enters the dead spot region. Thus, the item may be downloaded while the vehicle is still experiencing good signal quality. For example, the content provider may select an existing content item that has a time duration about equal to the length of time that the vehicle is expected to be in the dead spot. Alternatively, the content provider may edit or delete material from a content item that has a longer time duration than the length of time that the vehicle is expected to be in the dead spot. Thus, the edited item may have a time duration matching the time period that the vehicle will be without connectivity. Regardless of how the content item is created or retrieved, the item may be downloaded or otherwise transmitted in its entirety to the requesting vehicle before the vehicle loses connectivity within the dead spot.

In one embodiment, the content item to be provided to the vehicle, with or without editing, may be selected based upon a planned route (which may include the dead spot) of the vehicle, based upon demographic information associated with at least one passenger within the vehicle, and/or based upon a geographic area of residence of at least one passenger within the vehicle. For example, the content item may be information or a commercial about known sites or locations of general interest that are disposed along the planned route of the vehicle. Known demographic information about one or more passengers within the vehicle may also be used to select content items. For example, products marketed to men may be selected if the vehicle owner is known to be male. Moreover, selection of the content to be edited out or deleted may be based upon passenger demographics. As one example, portions of an advertisement may be pre-designated as being directed either to males or to females, and such portions may be accordingly deleted from the advertisement depending upon whether the listeners inside the vehicle are known to be male or female. It is also possible for an advertisement to be selected based upon the advertised product or service being offered or available in the local area geographic area in which at least one of the vehicle passengers resides.

In a final step 508, the transmitted item is played back within the vehicle while the vehicle is traveling through the dead spot region. That is, after the vehicle receives the content item from the content provider, the vehicle may store the content item in a memory device. Once the vehicle enters the dead spot, the vehicle may retrieve the item from memory and play back the item within the vehicle on speakers and/or a video screen within the vehicle.

In another embodiment, the invention is applied to internet applications other than streaming multimedia. For example, the invention could be used in downloading maps for turn-by-turn directions. Such an application may not require continuous communication with the internet content provider, but rather only periodic and/or intermittent communication with the internet content provider. In the specific embodiment of downloading maps for turn-by-turn directions, the application may re-establish a link with the internet content provider only when the application is in need of additional information. For instance, when the vehicle has reached the outer boundary of the geographic area for which the vehicle has already downloaded relevant maps, the vehicle may download additional maps for the next geographic area on the vehicle's planned route. Although it may be possible to download complete map information for an entire journey at the beginning of the journey, a large amount of memory may be required, and the planned route of the vehicle may be modified in the middle of the journey either voluntarily or due to road closings.

According to the invention, if the system determines that the vehicle will be in a dead spot when the system will next be in need of additional map information, then the system may re-establish communication immediately with the content provider and request the additional map information that the system knows it will need when the vehicle is in the dead spot. That is, instead of telling the content provider where the vehicle is and where it is going, the system can tell the content provider where the vehicle will be and where the vehicle will go from there. Alternatively, any of the other methods described herein, such as asking a nearby vehicle within communication range to download and transmit the needed information, may be applied to applications that require only intermittent communication.

The above-described turn-by-turn navigation and other types of navigation applications may call for certain types of information to be downloaded when the vehicle is in a certain geographic area. Thus, the system of the invention may not be concerned with what time period that the vehicle will be in a dead spot so much as what information the system will need when the system is in the next dead spot.

The present invention has been described herein primarily in connection with streaming media applications and maps. However, it is to be understood that the present invention may also be applied to other types of internet services, such as browsing webpages, FACEBOOK, etc., which could use wireless deadspot connection information and mitigation information.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A wireless communication method comprising the computer-implemented steps of:
    identifying a location of a dead spot region in response to the vehicle having a loss of wireless connectivity within the dead spot region;
    recording the location of the dead spot region;
    recognizing the dead spot region within an expected route of the vehicle;
    estimating a length of time before the vehicle will arrive at the dead spot region;
    estimating a length of time before the vehicle will exit the dead spot region;
    accessing audio content and/or video content from at least one source inside the vehicle and/or at least one source outside the vehicle such that playing of the content is uninterrupted while the vehicle is within the dead spot region, the accessing being dependent upon the two estimating steps;

determining respective time durations of a plurality of items of the content that are available from the at least one source outside the vehicle; and selecting at least one of the items of content that are available from the at least one source outside the vehicle such that playback within the vehicle of the selected at least one item of content can be completed before the vehicle arrives at the dead spot region, wherein the accessing step includes:

determining respective time durations of a plurality of items of the content that are available from the at least one source outside the vehicle;

selecting at least one of the items of content that are available from the at least one source outside the vehicle;

ascertaining that playback within the vehicle of the selected at least one item of content cannot be completed before the vehicle arrives at the dead spot region if the at least one item of content is received within the vehicle as a real time broadcast; and in response to the ascertaining step, downloading the at least one item of content to the vehicle before the vehicle arrives at the dead spot region.

2. The method of claim 1 wherein the downloading is performed by use of a plurality of threads.

3. The method of claim 1 wherein the downloading is performed by use of a plurality of wireless technologies and a plurality of simultaneous connections to an application server.

4. The method of claim 1 wherein the at least one source outside the vehicle comprises a radio station.

5. The method of claim 1 comprising the further step of providing feedback to a user within the vehicle, the feedback informing the user of at least one of:

an estimated length of time before the vehicle enters a dead spot region;

an estimated travel distance before the vehicle enters a dead spot region;

an estimated length of time that the vehicle will travel through a dead spot region; and an estimated distance that the vehicle will travel through a dead spot region.

6. The method of claim 1 wherein the accessing step includes using a connectionless protocol while the vehicle is within the dead spot region, and a connection-oriented protocol while the vehicle is not within the dead spot region.

7. A wireless communication method comprising the computer-implemented steps of:

identifying a location of a dead spot region in response to the vehicle having a loss of wireless connectivity within the dead spot region;

recording the location of the dead spot region;

estimating a length of time before the vehicle will again arrive at the dead spot region;

estimating a length of time before the vehicle will exit the dead spot region;

accessing audio content and/or video content from at least one source inside the vehicle and/or at least one source outside the vehicle such that playing of the content is uninterrupted while the vehicle is within the dead spot region, the accessing being dependent upon the two estimating steps; and providing feedback to a user within the vehicle, the feedback informing the user of at least one of:

an estimated length of time before the vehicle enters a dead spot region;

an estimated travel distance before the vehicle enters a dead spot region;

an estimated length of time that the vehicle will travel through a dead spot region; and an estimated distance that the vehicle will travel through a dead spot region, wherein the accessing step includes:

determining respective time durations of a plurality of items of the content that are available from the at least one source outside the vehicle;

selecting at least one of the items of content that are available from the at least one source outside the vehicle;

ascertaining that playback within the vehicle of the selected at least one item of content cannot be completed before the vehicle arrives at the dead spot region if the at least one item of content is received within the vehicle as a real time broadcast; and in response to the ascertaining step, downloading the at least one item of content to the vehicle before the vehicle arrives at the dead spot region.

8. The method of claim 7 wherein the accessing step includes:

wherein the selecting at least one of the items of content includes such that playback within the vehicle of the selected at least one item of content can be completed before the vehicle arrives at the dead spot region, the selecting being dependent upon the time durations of the items of content.

9. The method of claim 7 wherein the downloading is performed by use of a plurality of threads.

10. The method of claim 7 wherein the downloading is performed by use of a plurality of wireless technologies and a plurality of simultaneous connections to an application server.

11. The method of claim 7 wherein the at least one source outside the vehicle comprises a radio station.

12. The method of claim 7 wherein the accessing step includes using a connectionless protocol while the vehicle is within the dead spot region, and a connection-oriented protocol while the vehicle is not within the dead spot region.

* * * * *